United States Patent
Hascher et al.

(10) Patent No.: US 11,821,214 B2
(45) Date of Patent: *Nov. 21, 2023

(54) EXTRUDED MAT

(71) Applicants: LOW & BONAR INC., Candler, NC (US); E.I. DU PONT DE NEMOURS AND COMPANY, Wilmington, DE (US)

(72) Inventors: Lori C. Hascher, Candler, NC (US); James E. Mathis, Candler, NC (US); W. Allan Wingfield, Candler, NC (US); Wazir Nobbee, Richmond, VA (US); Rupa Kibbe, Wilmington, DE (US)

(73) Assignees: LOW & BONAR INC., Candler, NC (US); E.I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,312

(22) Filed: Jul. 30, 2021

(65) Prior Publication Data

US 2021/0355687 A1    Nov. 18, 2021

Related U.S. Application Data

(63) Continuation of application No. 16/240,583, filed on Jan. 4, 2019, now Pat. No. 11,105,099.
(Continued)

(51) Int. Cl.
*E04B 1/70* (2006.01)
*E04F 13/00* (2006.01)
(Continued)

(52) U.S. Cl.
CPC ............ *E04F 13/007* (2013.01); *E04B 1/625* (2013.01); *E04B 1/7076* (2013.01);
(Continued)

(58) Field of Classification Search
CPC ... E04B 1/32; E04B 1/34; E04B 1/169; E04B 1/3205; E04B 7/10; E04B 7/102;
(Continued)

(56) References Cited

U.S. PATENT DOCUMENTS 4,943,185 A   7/1990 McGuckin et al.
5,860,259 A *  1/1999 Laska ................... E04B 1/7612
                                                    52/404.1
(Continued)

FOREIGN PATENT DOCUMENTS

DE   298 05 622 U1   7/1998
DE   102 34 018 A1   2/2004
(Continued)

OTHER PUBLICATIONS

Apr. 15, 2019 European Search Report issued in European Patent Application No. PCT/IB2019/050124.

*Primary Examiner* — Brian E Glessner
*Assistant Examiner* — James J Buckle, Jr.
(74) *Attorney, Agent, or Firm* — Oliff PLC

(57) ABSTRACT

A drainage component having a continuous, extruded mat having an upper face and a lower face. The mat includes a plurality of patterned three-dimensional structures, each structure spaced from all adjacent structures, and the plurality of patterned three-dimensional structures are provided in a plurality of linear rows or columns in a first direction.

18 Claims, 3 Drawing Sheets

Related U.S. Application Data

(60) Provisional application No. 62/614,795, filed on Jan. 8, 2018.

(51) Int. Cl.

| | | |
|---|---|---|
| *E04B 1/76* | (2006.01) | |
| *E04D 13/17* | (2006.01) | |
| *E04D 12/00* | (2006.01) | |
| *E04B 1/62* | (2006.01) | |
| *B29C 48/08* | (2019.01) | |
| *B29C 48/00* | (2019.01) | |
| *B29L 7/00* | (2006.01) | |

(52) U.S. Cl.
CPC .......... *E04B 1/7612* (2013.01); *E04D 12/002* (2013.01); *E04D 13/17* (2013.01); *B29C 48/0011* (2019.02); *B29C 48/08* (2019.02); *B29L 2007/008* (2013.01); *E04D 13/176* (2013.01)

(58) Field of Classification Search
CPC ......... E04H 15/20; E04H 15/22; E04H 15/36; E04H 15/644; E04H 2015/207; E04H 15/16; E04H 15/54
USPC ............ 52/2.11, 2.18, 2.22, 2.23, 2.24, 80.1, 52/80.2, 81.1
See application file for complete search history.

(56) References Cited

U.S. PATENT DOCUMENTS

| | | |
|---|---|---|
| 6,131,353 A | 10/2000 | Egan |
| 6,804,922 B1 | 10/2004 | Egan |
| 7,972,981 B2 | 7/2011 | Anderson et al. |
| 8,222,164 B2 | 7/2012 | Anderson et al. |
| 8,328,968 B2 | 12/2012 | Anderson et al. |
| 8,647,734 B2 | 2/2014 | Keene |
| 8,734,932 B2 | 5/2014 | Keene |
| 8,955,278 B1 | 2/2015 | Mills |
| 9,187,902 B2 | 11/2015 | Krasnoff et al. |
| 9,359,766 B2 | 6/2016 | Shiao et al. |
| 9,765,459 B2 | 9/2017 | Afshari |
| 9,783,980 B2 | 10/2017 | Snyder et al. |
| 9,790,629 B2 | 10/2017 | Anderson et al. |
| 2001/0054263 A1 | 12/2001 | Coulton |
| 2003/0126810 A1 | 7/2003 | Brunson et al. |
| 2004/0045242 A1 | 3/2004 | Lake |
| 2013/0133258 A1 | 5/2013 | Carter |
| 2017/0198470 A1 | 7/2017 | Hickie et al. |
| 2018/0066427 A1 | 3/2018 | Snyder |

FOREIGN PATENT DOCUMENTS

| | | |
|---|---|---|
| EP | 0288257 A2 | 10/1988 |
| EP | 1191161 A2 | 3/2002 |
| EP | 1255265 A1 | 11/2002 |
| EP | 2065534 A1 | 6/2009 |
| EP | 1789622 B1 | 12/2014 |
| EP | 1913177 B1 | 9/2015 |
| EP | 2268753 B1 | 9/2017 |
| GB | 2 496 244 A | 5/2013 |
| GB | 2 518 055 A | 3/2015 |
| GB | 2 525 103 A | 10/2015 |
| JP | 2007-070865 A | 3/2007 |
| WO | 02/066246 A1 | 8/2002 |
| WO | 2004/082932 A1 | 9/2004 |
| WO | 2006/080907 A1 | 8/2006 |
| WO | 2008/085394 A1 | 7/2008 |
| WO | 2009/105464 A2 | 8/2009 |
| WO | 2015/010208 A1 | 1/2015 |
| WO | 2015/027282 A1 | 3/2015 |
| WO | 2017/021140 A1 | 2/2017 |

* cited by examiner

EXTRUDED MAT

This application is a continuation application of U.S. patent Ser. No. 16/240,583, filed Jan. 4, 2019, the entire disclosure of which is hereby incorporated by reference in its entirety.

BACKGROUND

A concern in building structures is the accumulation of moisture within particular areas. For example, moisture that accumulates in or near an exterior wall of a building can cause premature deterioration of the structure. Certain devices and methods to provide ventilation or drainage passageways between an inner sheathing member and an outer building material of the building structure are known.

One type of building product includes a roll-form spacer made of an elongate web of material which can be utilized in a wall or roof construction to provide continuous, unobstructed, vertically-disposed drainage paths, as discussed in U.S. Pat. No. 6,594,965. However, such a configuration has insufficient compression ability in certain applications and cannot be provided in a manner whereby the component can be installed in any direction and still provide drainage, and further, may not be applicable to both residential and commercial type buildings.

SUMMARY

The instant application may provide for a drainage component and building structure system that can have improved drainage and ventilation capabilities. In some embodiments, the drainage component may allow for installation in any orientation, and may have drainage ability along the machine direction of the drainage component, the cross (perpendicular) direction thereto, and even along one or more diagonal or slanted directions.

Disclosed herein is a drainage component having a continuous, extruded mat having an upper face and a lower face. The drainage component includes a plurality of patterned three-dimensional structures, each structure spaced from all adjacent structures. The plurality of structures are provided in a plurality of linear rows or columns in a first direction, but three-dimensional structures of adjacent ones of the linear rows or columns in the first direction are offset from each other in a second direction perpendicular to the first direction.

Also disclosed herein is a building structure having a member, a drainage component, and a composition comprising cement. The drainage component includes a continuous, extruded mat having an upper face and a lower face. The mat has a plurality of patterned three-dimensional structures, each structure spaced from all adjacent structures. The plurality of patterned three-dimensional structures is provided in a plurality of linear rows or columns in a first direction, but three-dimensional structures of adjacent ones of the linear rows or columns in the first direction are offset from each other in a second direction perpendicular to the first direction.

Also disclosed herein is a drainage component having a continuous, extruded mat having an upper face and a lower face. The drainage component includes a plurality of patterned three-dimensional structures, each structure spaced from all adjacent structures. The plurality of structures are provided in a plurality of linear rows or columns, and each of the plurality of patterned three-dimensional structures are six sided.

DETAILED DESCRIPTION OF EMBODIMENTS

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device and method described herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, the subject matter of this application illustratively disclosed herein suitably may be practiced in the absence of any element(s) that are not specifically disclosed herein.

The following definitions are provided in order to aid those skilled in the art in understanding the detailed description.

As used herein, the term "rainscreen" refers to a drainage component to be provided within, on, or near a wall or other building structure to create a capillary break and/or to allow drainage and evaporation of moisture and/or water vapor. One skilled in the art may also consider a rainscreen equivalent to a wall drain, and wall vent.

Figure 1:
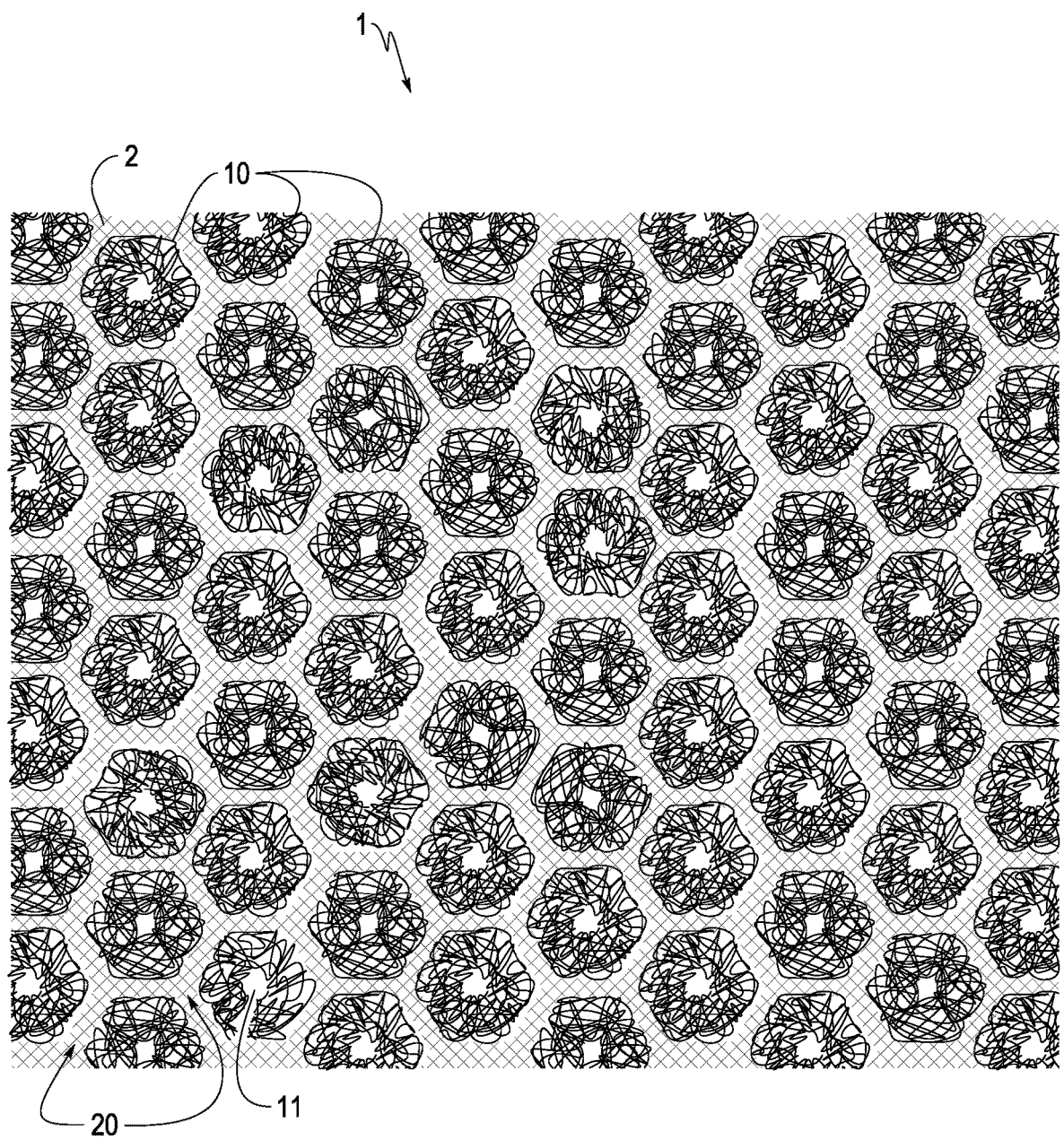
FIG. 1 is an elevation view of a portion of the upper face of the drainage component according to some embodiments.

Referring to FIG. 1, a drainage component having a mat 1 is provided. The mat 1 may be adapted to be placed within a sidewall of a building structure, for example by being placed between an inner sheathing member (e.g., a member of a wall or the like) and an outer building material of the building structure.

While the discussed embodiments relate to and describe a mat that is used as a rainscreen and with reference to a wall of a building, the mat described herein can also be applicable to other configurations, such as in a roofing component, or in any component whereby ventilation and/or control of moisture runoff is desired, such as in an air conditioning unit or the like.

The mat 1 may be formed of an elongate, indeterminate-length openwork mat (or web), of randomly convoluted polymeric filaments. The randomly convoluted polymeric filaments of the mat may be made of any thermoplastic material. In some embodiments, the thermoplastic material is able to withstand temperatures of over 65 to about 100° C. The thermoplastic material may be, for example, a polyester, polyolefin, or nylon. Exemplary materials for the thermoplastic material include polypropylene, nylon 6 (or polyamide 6), polylactic acid, polycaprolactone, polyethylene terephthalate, polybutylene terephthalate, polytrimethylene terephthalate, polyethylene naphthalate, vectran, high density polyethylene, and blends or copolymers thereof. In some embodiments, the composition of the mat may include one or more additives that may improve properties of flame retardance, UV resistance and moisture management to meet or exceed customer or regulatory requirements.

The filaments may be provided in a manner so as to intersect each other and provide for improved compression resistance of the three-dimensional structure described further below.

The mat 1 may be formed in a plurality of patterned three-dimensional structures 10, the three-dimensional structures 10 working together to form a three-dimensional matrix of filaments. The matrix may be provided in such a manner whereby the filaments and polymers of the filaments have improved strength and also allow for improved compression.

The mat 1 includes a plurality of patterned three-dimensional structures forming a mat having an upper face and a lower face, each structure spaced from all adjacent structures. The plurality of structures are provided in a plurality of linear rows or columns in a first direction, but structures of adjacent linear rows or columns in the first direction are offset from each other in a second direction perpendicular to the first direction. That is, when viewing the drainage component in two dimensions, the three-dimensional structures are aligned either vertically or horizontally (the first direction) in a series of rows, but are staggered (not aligned) in the direction perpendicular to the first direction (e.g., horizontally or vertically; the second direction).

The three-dimensional structures 10 may each be polygonal structures and may be six-sided in nature. Some embodiments may conceive of rounded structures, square or rectangular structures, or even structures having eight or more sides, provided that the structures are aligned in rows along a first direction but staggered along the perpendicular second direction. Some embodiments may have less than six sided structures, including three sided structures or five sided structures, or structures that have even less sides, provided again that the structures are aligned in rows along a first direction but staggered along the perpendicular second direction.

The three-dimensional structures 10, particularly when designed as six-sided polygonal structures, may allow for improved reinforcement characteristics of the mat 1. As an example, the shaping of the structures 10 may allow for the strengthened bond points in the filaments comprising each three-dimensional structure 10 and adjacent ones of the structures, so as to aid in prevention of the mat 1 from collapsing into itself when under load.

When the three-dimensional structures 10 are provided as described above, there may be an improved surface wall area which can ultimately improve strength of the mat 1 while still having open areas to allow for drainage.

The spaces 20 between adjacent ones of the three-dimensional structures 10 may include polymeric filaments having a substantially same composition as those comprising the three-dimensional structures. In some embodiments, the spaces 20 include polymeric filaments in an orientation that provides the relevant portion of the mat 1 to be denser that are than in the portion of the mat 1 making up the three-dimensional structures 10. However, the mat of the polymeric filaments in the spaces 20 may also be provided with a relatively same density, or a lower density, than those making up the three-dimensional structures 10. The mat of the polymeric filaments in the spaces may also be pressed during manufacture to form drainage channels or troughs between the three-dimensional structures 10. There also may be no polymeric filaments between adjacent structures, and thus, the space 20 may be entirely free of additional material. In such a case, the bonding of the structures to a fabric, described in more detail below, allows for the mat to be provided in a continuous manner.

The spaces are desirably formed by melting or press-melting filaments to improve adhesion to a backing (e.g., the fabric as described further below).

A mold comprising structures may be used to form the plurality of three-dimensional structures shown in FIG. 1. The spaces 20 between the three-dimensional structures may be formed from the mold at the raised portions of the mold, the raised portions forming a honeycomb-type pattern.

Referring back to FIG. 1, the three-dimensional structures 10 may also have an indentation 11 in the center, or substantially near the center, of each structure. The indentation may protrude at least part way, or even fully through the thickness of the three-dimensional structure 10. That is, the indentation may protrude from the upper face of the mat at least part way toward the lower face of the mat 1, and in some cases may protrude all the way to the lower face of the mat. The indentation may be formed in the same manner as the spacing between the structures, and may be formed using a mold. The indentation may also be formed by press melting using the mold.

A thickness of the mat 1 (e.g., from the bottommost surface of the mat to the topmost surface of a three-dimensional structure 10) may be from about 1 mm to about 20 mm, or about 3 mm to about 10 mm, or about 3 mm, about 6 mm, or about 10 mm.

The diameter of the three-dimensional structures 10 (or longest distance from one end to an opposite end, in a case where the structures are not spherical) may be from about 2 mm to about 60 mm, or from about 10 mm to about 20 mm.

The weight of the core (mat) may be from about 5 to about 25 ounces per square yard, including about 11 ounces per square yard.

The mat may have the quality, in view of the configuration described above, where there is no blockage of rain channels from the cladding material of the building. Further, the mat can be used in a variety of building applications, for both commercial and residential applications, where compression resistance and air flow are required.

The mat may be structured to advantageously allow for installation in any orientation, and may have drainage ability along the machine direction of the drainage component, the cross (perpendicular) direction thereto, and even along one or more diagonal or slanted directions.

Additionally, the mat 1 may have a flexibility so that it can be easily installed around walls and corners of walls and the like. The structure utilizing the mat 1 may have improved conformability around building structures and corners generally. Further, the mat 1 and associated structure may have a quality where it can lay flat in use.

The three-dimensional structures 10 and, ultimately, the mat 1 may be formed by extrusion of the thermoplastic material at a temperature above the melting point of the material into a structure or mold having a patterned configuration. Such a mold may have the same or substantially similar patterned configuration as the ultimately produced mat.

By way of example, a contemplated process for producing the mat is to utilize a method where continuous melt-spun thermoplastic monofilaments are extruded onto a profiled support structure or mold in overlapping rows of irregular loops which are self-bonded or fused at random points of intersection without using any bonding agent or reinforcing inserts. However, bonding agents or inserts may also be used.

The patterns of three-dimensional structures 10 can be particularly made using an extrusion of filaments into a shaped mold and cooled. The spacing between the three-dimensional structures 10 may be made by extrusion with the heated mold having a particular pattern. Pressing of the heated mold may or may not occur.

Figure 2:
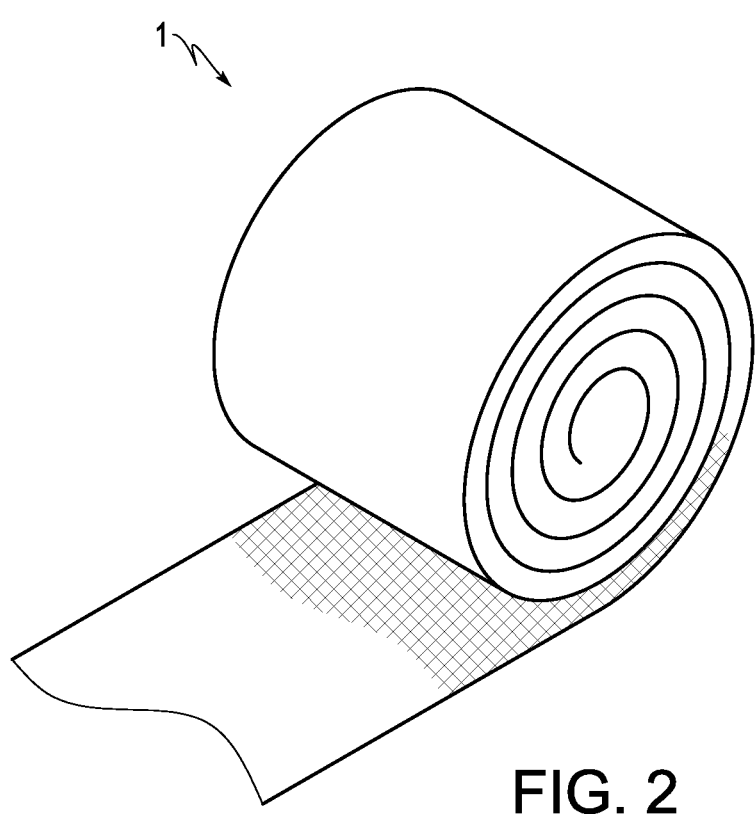
FIG. 2 is a perspective view of a roll of the drainage component according to some embodiments.

Referring to FIG. 2, the mat 1 may be provided in a spiral roll which may aid in manufacture, transport, storage and installation. The mat can be unrolled laterally onto the inner sheathing member such that the rear (or lower) face of the mat 1, faces the inner sheathing member and/or membrane. Alternatively, the mat 1 may be provided in sheet form.

Referring back to FIG. 1, in some embodiments, the mat 1 can optionally include a fabric attached thereto 2. The fabric may be any viable fabric, alternatively considered a fleece or nonwoven, and may also be any component understood in the art to constitute a weather barrier, such as Tyvek®, manufactured by the DuPont corporation. The fabric 2 may have a quality to protect the mat 1 from receiving unwanted amounts of moisture and/or material such as stucco or mortar, and may act as a grab layer to help connect the composite components together within the wall structure.

In some embodiments, the fabric 2 is a filter fabric. The fabric 2 can be provided in roll or sheet form and can be connected with the patterned three-dimensional structures by any known method, such as being press-fit, bonded either by an adhesive or a melting bond with the filaments, or otherwise adhered to the upper or lower face of the mat 1. In some embodiments, it is desirable to provide the fabric 2 at the lower face of the mat 1. In other embodiments, it has been conceived that a fabric 2 is adhered to the upper face of the mat 1 and a second fabric is adhered to the lower face of the mat 1, thus sandwiching the mat 1 between two fabrics.

The fabric 2 may be a filter fabric sheet comprising a porous, liquid permeable and wettable sheet and having a hydrostatic head of less than 150 mm selected from the group consisting of woven fabrics, spunbonded nonwoven sheets, spunlaced nonwoven sheets, spunbonded-meltblown nonwoven sheets, spunbond-meltblown-spunbond nonwoven sheets and perforated films. The hydrostatic head or water resistance of the filter fabric may be measured by a known standard, such as for example, AATCC-127.

The filter fabric sheet may include a hydrophilic polymer additive or may include a coating with a surfactant in an amount sufficient to impart wettability, or is plasma treated.

The fabric 2 may be adhered to the mat 1 at the indentations 11 of the three-dimensional structures 10 of the mat. In some embodiments, the fabric 2 is bonded to the mat 1 only at such indentations 11. The adherence may be by any known method such as being press-fit, bonded either by an adhesive or a melting bond with the filaments, as described above.

The fabric 2 may be a spun-bonded nonwoven fabric. That is, the filaments may intersect each other at one or multiple points along each respective filament and are bonded to each other at intersecting points.

The fabric 2 may be adhered to the mat 1 during machining, and prior to rolling the mat 1 into a spiral roll. The fabric 2 may also be adhered to the mat 1 just prior to or during installation of the mat 1 to the building structure.

The fabric 2 may have a weight from about 30 to about 200 $g/m^2$, or about 50 to about 200 $g/m^2$, or about 60 to about 100 $g/m^2$.

The fabric 2 may also include, or alternatively be, a fabric that has an ultraviolet or hydrophilic component.

The mat 1 and fabric 2 may in some embodiments together form a composite that may be considered a rainscreen. In some embodiments, however, the fabric 2 is not included and the mat 1 itself forms the rainscreen.

The composite may have an advantageous property where it can lay substantially flat during install. The orientation, for example, of the three-dimensional structures 10 and the like may avoid for pillowing at install, and accordingly avoid air trapped being underneath, without wrinkles in the material.

The fabric 2 may be machined to have a flap portion, the flap portion being a portion that is provided to extend beyond the length of the mat 1 in at least one direction when adhered to the mat 1. The flap of the fabric 2 may be used to aid in connecting multiple composites together during installation. The flap may allow for even coverage and avoid any compromising of the drainage space provided by the mat 1. Further, the flap may act as an extra layer of protection to the drainage space of the mat 1.

While the above-description relates to a fabric 2 such as a filter fabric and/or a weather barrier, use of a fabric that instead or additionally provides insulation, a radiant barrier, or has an air filtering quality is also conceived. For example, the fabric 2 may instead be in the form of a permeable radiant barrier. The permeable radiant barrier may include porous sheets, which include woven fabrics, such as sheets of woven fibers or tapes, or nonwoven fabrics, such as flash-spun plexifilamentary sheets, spunbond nonwoven sheets, spunbond-meltblown nonwoven sheets, spunbond-meltblown-spunbond nonwoven sheets, and laminates that include a nonwoven or woven fabric or scrim layer and a moisture vapor permeable film layer, such as a microporous film, a microperforated film or a moisture vapor permeable monolithic film. The starting sheet layer of the permeable radiant barrier can comprise a moisture vapor permeable sheet that has been coated using conventional coating methods. For example, sheets currently used in the construction industry include sheets of woven tapes that have been coated with a polymeric film layer and microperforated. The sheet layer may be formed from a variety of polymeric compositions. For example, sheets used in the construction industry are typically formed from polyolefins such as polypropylene or high density polyethylene, polyesters, or polyamides.

The permeable radiant barrier may also be a flash spun plexifilamentary polyolefin sheet such as Tyvek® flash spun high density polyethylene, available from E. I. du Pont de Nemours and Company, Inc. (Wilmington, Del.). Suitable flash spun plexifilamentary film-fibril materials may also be made from polypropylene. The moisture vapor permeable sheet can be a laminate of a flash spun plexifilamentary sheet with one or more additional layers, such as a laminate comprising a flash spun plexifilamentary sheet and a melt-spun spunbond sheet. Flash spinning processes for forming web layers of plexifilamentary film-fibril strand material are disclosed in U.S. Pat. No. 3,081,519 (Blades et al.), U.S. Pat. No. 3,169,899 (Steuber), U.S. Pat. No. 3,227,784 (Blades et al.), U.S. Pat. No. 3,851,023 (Brethauer et al.), the contents of which are hereby incorporated by reference.

The permeable radiant barrier may alternatively or additionally include a metallic reflective coating on one or both surfaces of the fabric 2.

Figure 3:
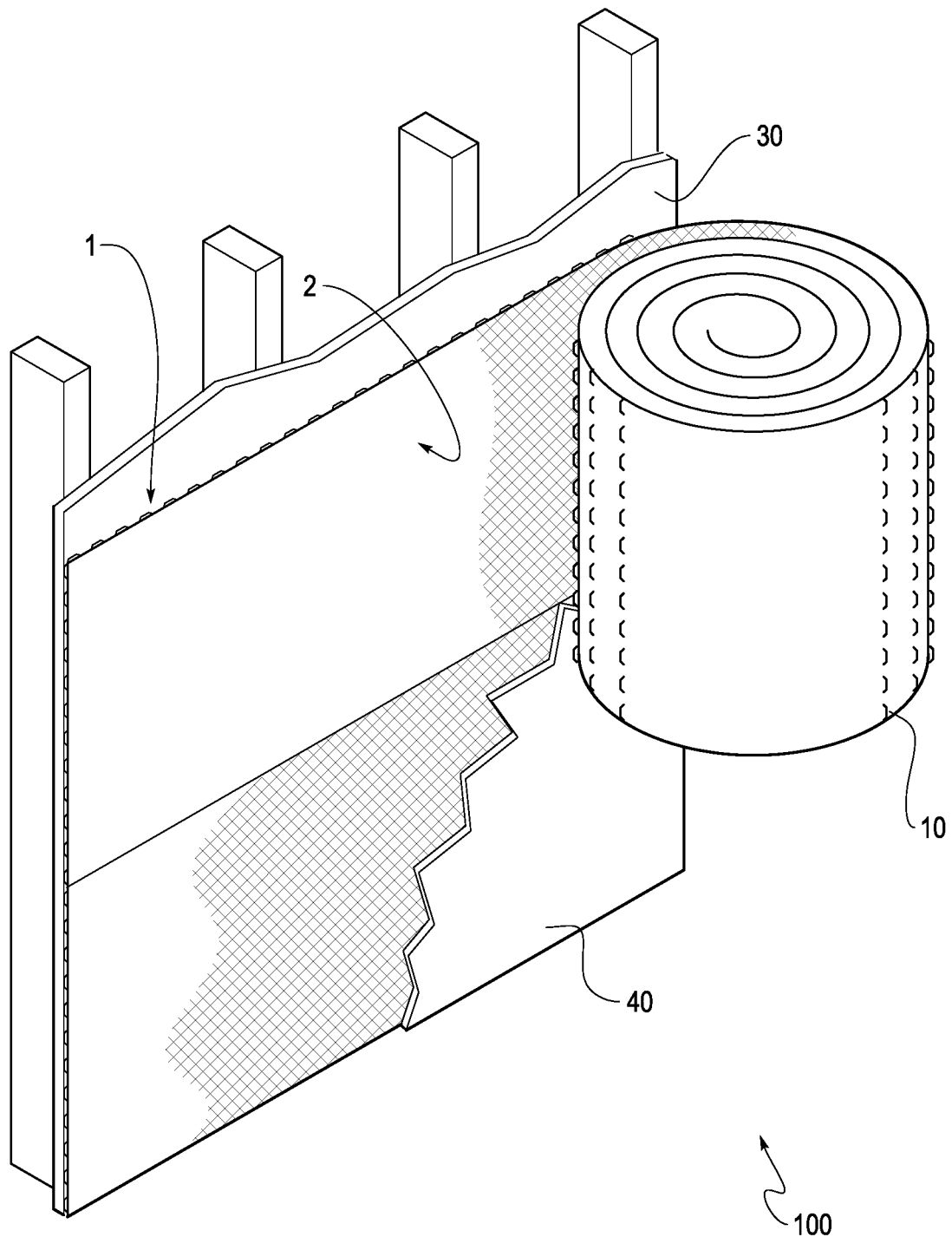
FIG. 3 is a view of a building structure including the drainage component according to some embodiments.

As shown, for example, in FIG. 3, the mat 1 may be attached to a wall 20 to form a reinforced wall structure 100 by any suitable method known in the art. The structure 100 may include the composite, for example of the fabric 2 and mat 1 including the three-dimensional structures 10. The structure may further include a member 30.

The member 30 may be a member of a wall, such as a sidewall of a building. In some embodiments the member 30 may be an inner sheathing member of a wall, the member being affixed to support posts. The inner sheathing member may be made of plywood, board, insulated concrete, a composite board, or any other material permitted by local building codes. The member 30 may also be another component in an interior portion of, for example, a sidewall.

In some embodiments, the mat 1 with the three-dimensional structures 10 is oriented to face and/or directly contact the member 30, while the opposite side of the composite includes the fabric 2. The fabric 2 may face and/or directly contact a composition 40. Such an orientation may, for example, protect the mat from being compromised by the composition 40 coming into contact with the mat 1.

In some embodiments, the composition 40 may comprise cement and may be mortar, stucco, or a combination thereof. In some embodiments, the composition may include wood/cedar, fiber cement, and metal, including non-cementitious metal. The member 30 may be a part of a sidewall of a building and/or within a sidewall of the building.

In some embodiments, the composite may be oriented whereby instead of the mat 1 facing the member 30, the fabric 2 faces and/or directly contacts the member 30, and the mat 1 instead faces the opposite direction. In such a situation, the composition 40 may be still included whereby the mat 1 faces and/or directly contacts the composition 40 (that is, there exists no fabric 2 in between the mat 1 and composition 40). Other applications that lack the presence of a composition 40, may be used.

In some embodiments, the composition 40 comprises cement, and the fabric 2 will be provided between the composition 40 and the mat 1. The mat 1 may be oriented whereby the structures 10 of the mat 1 face the member 30. In some embodiments, the composition 40 does not comprise cement, and there may or may not exist a fabric wall 2 between the composition 40 and the mat 1. The mat 1 may be oriented in this case where either the structures 10 face the member 30, or the structures 10 face opposite from the member 30.

Further, although the preceding description has been described herein with reference to particular means, materials and embodiments, it is not intended to be limited to the particulars disclosed herein; rather, it extends to all functionally equivalent structures, methods and uses, such are within the scope of the appended claims.

What is claimed is:

1. A drainage component, comprising:
   a continuous, extruded mat having an upper face and a lower face,
   wherein the mat comprises randomly convoluted polymeric filaments, the randomly convoluted polymeric filaments being self-bonded or fused at random points of intersection and being shaped into a plurality of patterned three-dimensional structures, each of the plurality of patterned three-dimensional structures spaced, including at a base thereof, from all adjacent patterned three-dimensional structures, including at respective bases thereof, and
   wherein the plurality of patterned three-dimensional structures are provided in a plurality of linear rows or columns, and each of the plurality of patterned three-dimensional structures are hexagonal.

2. The drainage component according to claim 1, further comprising a fabric sheet adhered to at least one of the lower face and the upper face of the mat.

3. The drainage component according to claim 1, wherein each of the plurality of patterned three-dimensional structures have an indentation at a substantially center portion of the respective patterned three-dimensional structure, the indentation protruding from the upper face of the mat toward the lower face of the mat.

4. The drainage component according to claim 3, further comprising a fabric sheet adhered to at least one lower face and the upper face of the mat.

5. The drainage component according to claim 1, wherein the network of the randomly convoluted polymeric filaments of the spacer portion has a higher density than the network of the randomly convoluted polymeric filaments of the patterned three-dimensional structures.

6. The drainage component according to claim 4, wherein the fabric sheet comprises a filter fabric.

7. The drainage component according to claim 2, wherein the fabric sheet comprises a permeable radiant barrier.

8. The drainage component according to claim 6, wherein the filter fabric is bonded to the mat at each of the indentations.

9. The drainage component according to claim 8, wherein the filter fabric is bonded to the mat only at each of the indentations.

10. A building structure, comprising:
    a member;
    a drainage component; and
    a composition,
    wherein the drainage component comprises a continuous, extruded mat having an upper face and a lower face,
    wherein the mat comprises randomly convoluted polymeric filaments, the randomly convoluted polymeric filaments being self-bonded or fused at random points of intersection and being shaped into a plurality of patterned three-dimensional structures, each of the plurality of patterned three-dimensional structures spaced, including at a base thereof, from all adjacent patterned three-dimensional structures, including at respective bases thereof, and
    wherein the plurality of patterned three-dimensional structures are provided in a plurality of linear rows or columns, and each of the plurality of patterned three-dimensional structures are hexagonal.

11. The building structure according to claim 10, wherein the drainage component further comprises a fabric sheet adhered to at least one of the lower face and the upper face of the mat.

12. The building structure according to claim 10, wherein the drainage component is provided between the member and the composition.

13. The building structure according to claim 10, wherein the composition comprises cement.

14. The building structure according to claim 11, wherein the drainage component is oriented so that the fabric sheet contacts the composition, and the mat contacts the member.

15. The building structure according to claim 10, wherein the member is an inner sheathing member of a sidewall of a building.

16. The building structure according to claim 11, wherein the fabric sheet comprises a filter fabric.

17. The building structure according to claim 11, wherein the fabric sheet comprises a permeable radiant barrier.

18. The building structure according to claim 10, wherein each of the plurality of patterned three-dimensional structures have an indentation at a substantially center portion of the respective patterned three-dimensional structure, the indentation protruding from the upper face of the mat toward the lower face of the mat.

\* \* \* \* \*